May 7, 1968  D. J. MARLEY  3,382,014
SELF-ACTING FOIL BEARINGS
Filed Feb. 18, 1966  3 Sheets-Sheet 1
FIG.-1
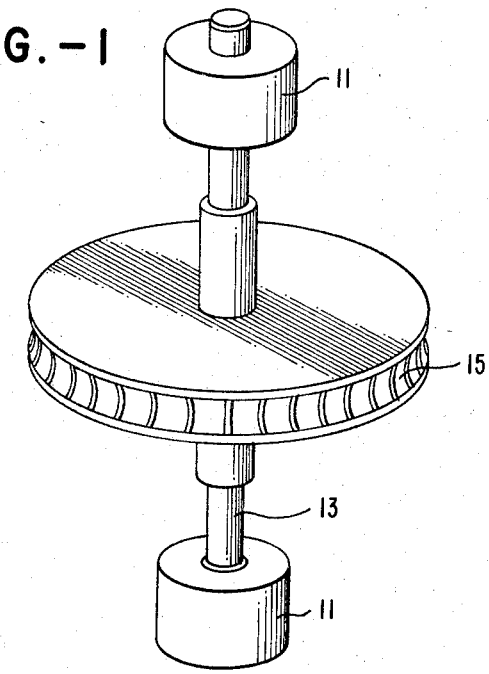
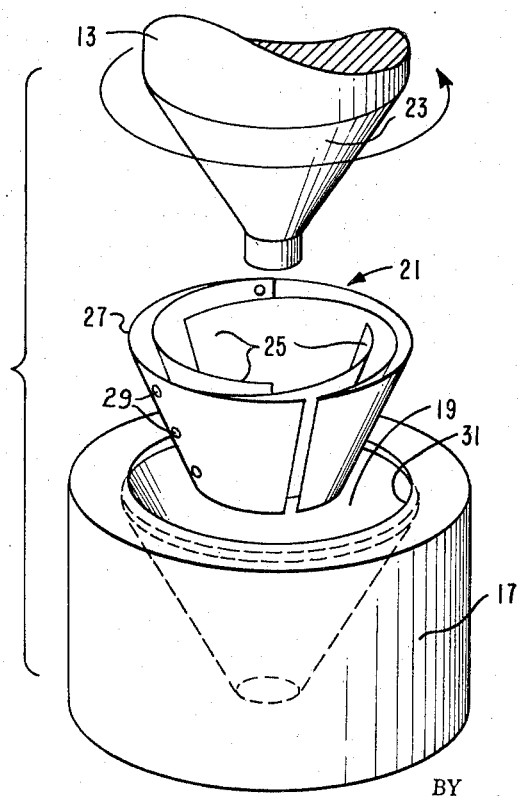
FIG.-2
INVENTOR.
DAVID J. MARLEY
BY Fraser and Bogucki
ATTORNEYS May 7, 1968  D. J. MARLEY  3,382,014
SELF-ACTING FOIL BEARINGS
Filed Feb. 18, 1966  3 Sheets-Sheet 2

INVENTOR.
DAVID J. MARLEY
BY Fraser and Bogucki
ATTORNEYS

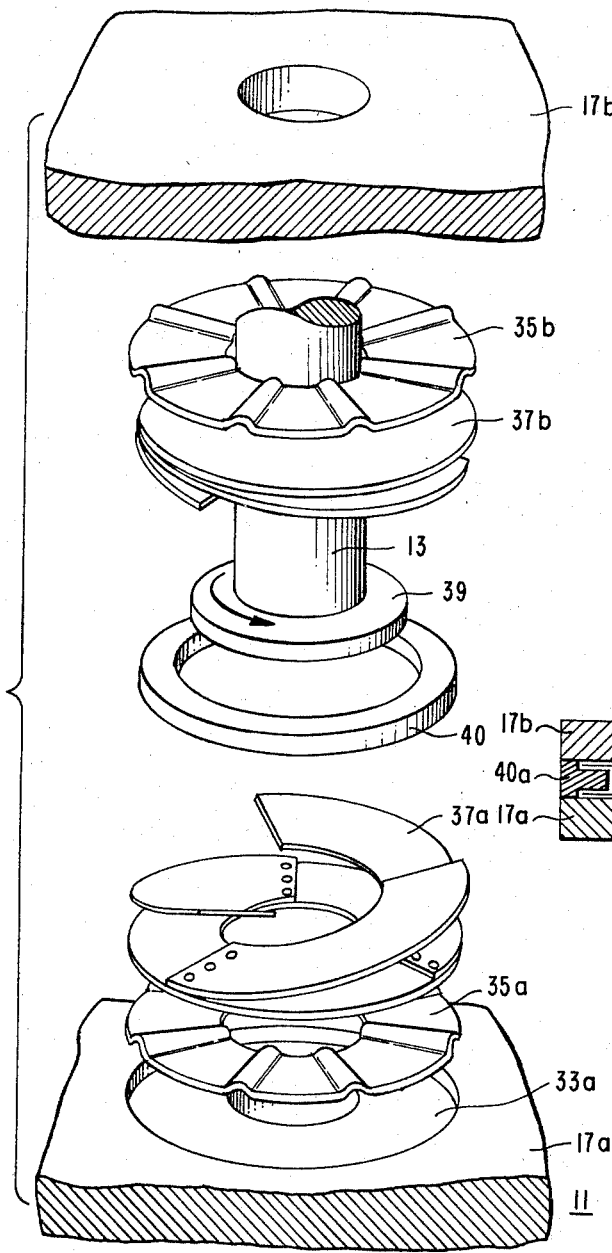
FIG. — 4
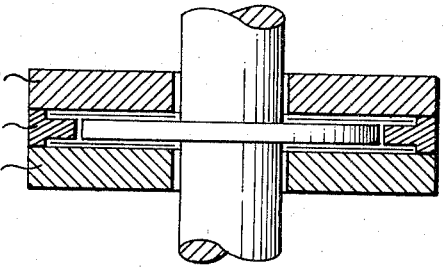
FIG. — 5
INVENTOR.
DAVID J. MARLEY
BY Fraser and Bogucki
ATTORNEYS United States Patent Office 3,382,014
Patented May 7, 1968

3,382,014
SELF-ACTING FOIL BEARINGS
David John Marley, Buena Park, Calif., assignor to The Garrett Corporation, Los Angeles, Calif., a corporation of California
Filed Feb. 18, 1966, Ser. No. 528,507
16 Claims. (Cl. 308—9)

ABSTRACT OF THE DISCLOSURE

A bearing is provided in which a plurality of foils in a unitary assembly resiliently mounted within a housing recess are in surface engaging relation with a rotatable shaft or an element such as a thrust disk affixed thereto. In the thrust bearing added axial resiliency may be provided by seating a resilient element such as a convoluted washer between the foil assembly and its support.

---

This invention relates to fluid-lubricated bearings for rotating machinery, and more particularly to bearings of this type utilizing foils as bearing surfaces.

Foil bearings, both hydrodynamic and hydrostatic, have been the subject of considerable investigation in recent years because of their capability for supporting rotating equipment at very high speeds approaching a million revolutions per minute or more. Hydrodynamic bearings are self-acting or self-pressurizing bearings in which the relative movement of a rotating shaft and bushing combination develops viscous shear which draws a fluid lubricant in between the bearing surfaces to provide the desired lubrication. Hydrodynamic bearings may be designed to use either a liquid or a gaseous lubricant, air being typically used as a lubricant where high speeds are involved.

Conventional high speed, fluid film-lubricated bearings of both the thrust and journal type have been particularly difficult to develop because of the close tolerances required to generate sufficient pressure in the fluid film. For example, typical requirements for a thrust bearing may necessitate that the bearing surfaces be flat to three helium light bands and be square to the axis of rotation within 50 millionths of an inch. Journal bearing dimensions and alignment must typically be held to a tolerance of 50 millionths of an inch. But even where tolerances are met, there are still problems of inertial and thermal distortion which often cause failure at high speed of structures manufactured within tolerances. Furthermore, since the bearings are frequently employed with very high speed turbines or other mechanisms which typically generate a very low starting torque, static friction and starting drag should be kept as low as possible.

It has been found that the above-mentioned problems may be obviated by providing a bearing structure in which foils comprising thin, flexible sheets are inserted in the bearing region, the sheets having a thickness relative to other dimensions such that the sheets may be locally deflected by hydrodynamic film forces between adjacent bearing surfaces and the foil. Typical foil thicknesses are a few thousandths of an inch. As contrasted with the limits mentioned hereinabove, manufacturing tolerances may now be typically specified to 0.0005 inch, a reduction of an order of magnitude or more. Foils used in this manner compensate effectively for the distortion mentioned above and they also compensate for slight variations in alignment of the bearing components.

In using foils in various types of bearings including journal and thrust types, it has been found that particular applications of the bearings may require that the foil arrangements be capable of modification or replacement. For example, if a particular machine having a number of bearings is being modified in its function to the extent that the bearings must meet additional speed or loading requirements, it may be desirable to replace the foil arrangements in the bearings rather than to rebuild the bearings or substitute new ones. A further consideration in those instances where the foil arrangements are to be modified or changed, and particularly where many bearings are involved, is that the foil arrangements be economical to fabricate and assemble and that they lend themselves more readily to mass production methods. Finally, it has been discovered that under certain operational conditions, and particularly in those instances where occasional shocks or sudden transient overloads are transmitted to the bearing, the rotating shaft within the bearing may come into contact with one or more of the foils with a force sufficient to tear or otherwise damage them. Bearings subjected to these conditions should preferably have their foils mounted in such a way that they may slip or give when in contact with the rotating shaft.

Accordingly, it is a general object of the present invention to provide an improved bearing of the fluid-lubricated type.

It is also an object of the present invention to provide an improved, fluid-lubricated bearing which is not subject to the extremely close manufacturing tolerances imposed by certain prior art bearings.

It is a further object of the invention to obviate problems heretofore encountered resulting from inertial and thermal distortion in high speed, fluid-lubricated bearing structures.

It is a specific object of the invention to provide a foil bearing, fluid-lubricated, in which the foil arrangement may be easily modified or replaced.

It is a further specific object of the invention to provide a fluid-lubricated foil bearing in which the foils are resiliently mounted in a manner to prevent foil damage in the event of contact between the foils and the rotating shaft or other moving parts within the bearing.

In brief, particular arrangements in accordance with the invention may comprise a plurality of foils resiliently mounted within a portion of a housing adapted to receive a rotatable shaft. Each of the foils of a given unit, which are in surface engaging relation with the rotatable shaft or with an element affixed thereto, is held in a fixed position relative to the other foils of that unit, thus providing a unitary foil assembly, which assembly may be advantageously slidably mounted within the adapted portion of the housing to prevent damage to individual foils.

In accordance with an embodiment of the invention, a thrust bearing may be fashioned by providing a housing with a recess configured to receive a thrust collar which is part of a rotatable shaft. The thrust collar is placed in surface engaging relation with a foil assembly slidably mounted within the recess. Axial resiliency against thrusts of the rotatable shaft may be provided by a resilient element of felt, rubber, steel wool or the like, but in one arrangement the resilient element comprises a convoluted washer positioned between the foil assembly and the recessed portion of the housing. In accordance with an aspect of the invention the outer periphery of the recess may be fashioned with appropriate structure such as a retaining lip to confine the foil assembly within the recess while permitting easy installation and removal of the assembly.

In one particular arrangement of the invention a double acting thrust bearing configuration is provided which is adapted to support thrust loads in both directions along a shaft axis. In this arrangement, the bearing comprises a thrust collar affixed to a shaft with duplicate foil assembly and convoluted washer combinations of the type described above positioned on opposite sides of the thrust collar in corresponding recesses of the housing. Thus one or the other of the duplicate combinations is available to support the applied thrust load, depending upon the direction thereof. Such a double acting thrust bearing arrangement is often desirable because the thrust load of a rotary machine often reverses direction with variations in speed, load on the machine, etc. over its operating range. In accordance with a particular aspect of the invention, an added element may be provided in the form of a foil retainer ring about the thrust collar and between the two foil assemblies of the arrangement just described in order to limit bearing preload and to complete the bearing housing.

In accordance with another embodiment of the invention, a journal bearing may be fashioned by providing a housing with an aperture extending therethrough and configured to receive a rotatable shaft therein. A foil arrangement is slidably mounted in a recess within the aperture with the foils in surface engaging relation with the rotatable shaft.

A third particular arrangement in accordance with the invention comprises a corresponding configuration of overlapping foils in relative fixed juxtaposition in the form of a conical bearing adapted to support a combination of thrust and side loading forces. The arrangement is such as to allow sliding rotation of the foil combination without disturbing the spatial relationship of the individual foils, one to the other.

In accordance with one aspect of the invention, each foil may be affixed to an adjacent foil by suitable fastening means such as by spot welding to provide a circular configuration, the foils being overlapped in shingle fashion. In accordance with another aspect of the invention, each foil may be affixed to a foil base by suitable fastening means such as spot welds to provide a circular configuration, the foils again being overlapped in shingle fashion. In accordance with a further aspect of the invention, the foil assembly may comprise interleaved sheets of metal and plastic to reduce metal-to-metal contact in the bearing and to provide a thin film of added lubrication on the bearing surfaces. The metal and plastic sheets may be affixed to a foil base by suitable means such as by fashioning each plastic sheet with one or more holes through which an adjacent metal sheet is spot welded to the base, or may be fashioned without the base by spot welding in similar manner through each plastic sheet to an adjacent foil.

A better understanding of the present invention may be had from a consideration of the following detailed description, taken in conjunction with the accompanying drawings, in which:

FIG. 1 is a diagrammatic view of one particular arrangement in accordance with the invention;

FIG. 2 is a partially disassembled view of one particular conical bearing arrangement which may be used in FIG. 1;

FIG. 4 is a partially disassembled view of another particular thrust bearing arrangement which may be used in FIG. 1;

FIG. 5 is a sectional view of the bearing of FIG. 4 showing a slight structural variation;

Figure 3:
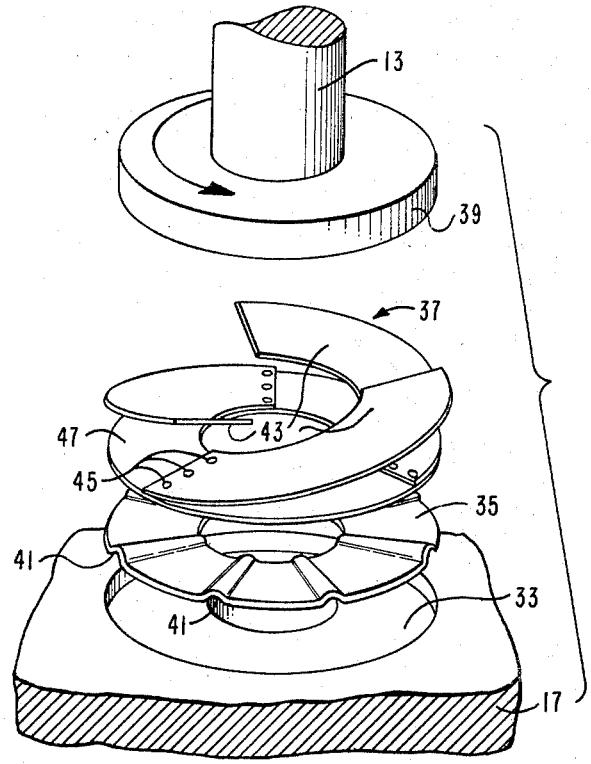
FIG. 3 is a partially disassembled view of a particular thrust bearing arrangement which may be used in FIG. 1.

FIG. 1 represents a typical bearing-shaft arrangement including bearings 11 encompassing a shaft 13 which is shown coupled to a turbine wheel 15 as an example only.

FIGS. 2–6 show alternative embodiments of bearing structures in accordance with the invention which may be used as the bearings 11 in FIG. 1. In FIG. 2 a bearing housing 17 is shown fashioned with a conical recess 19 to receive a foil assembly 21 and the conical tip 23 of the shaft 13, the conical tip 23 being smaller than the conical recess 19 and in surface engaging relation with the foils when the bearing is assembled. The foil assembly 21 is shown comprising a plurality of overlapping foils 25 mounted on a foil base 27, the foils being fastened thereto by a plurality of spot welds 29 (only a few of which are shown in FIG. 2 for illustrative purposes). The foil assembly 21 is depicted as having three foils 25 for purposes of illustration only. In actual practice each foil extends partially around the periphery of the shaft 13 and a sufficient number of foils are provided so that they overlap each other by a substantial amount to develop the desired air bearing operation. A retaining lip 31 at the outer periphery of the conical recess 19 has an inner diameter somewhat smaller than the diameter of the outer periphery of the recess, thereby serving to retain the foils 25 within the recess against any tendency they may have to twist out of the recess. The foil base 27 is shown as a strip of metal fashioned into a shape approximating the outer surface of a conical section. The spacing between the two ends of the strip is not critical but the ends are not permitted to overlap when the assembly is in position beneath the retaining lip 31 and within the conical recess 19. During normal use of the bearing, there is sufficient friction between the base 27 and the sides of the conical recess 19 to hold the foil assembly stationary against the rotational forces of the rotating shaft 13. Viscous shear occurs between the conical tip 23 and the foils 25, pulling fluid into the bearing to provide the proper lubrication. In the event the conical tip 23 actually contacts one or more of the foils 25, as under a momentary overload, the base 27 slides within the conical recess 19 thereby preventing damage to the foils.

In the particular arrangement of the invention shown in FIG. 3, the housing 17 is fashioned with a cylindrical recess 33 to receive a washer 35, a foil assembly 37, and a thrust collar 39 affixed to a rotatable shaft 13. The thrust collar 39, which is cylindrical in shape and slightly smaller than the cylindrical aperture 33, is in surface engaging relation with the foils of the foil assembly 37 when the bearing is assembled. The washer 35, which has a plurality of convoluted sections 41, provides added resiliency against the axial thrust of the shaft 13 and may be included in any of the depicted arrangements of the invention, if desired, with appropriate adaptation to the shape of the corresponding bearing surfaces. The foil assembly 37 is shown comprising a plurality of foils 43 fastened by a plurality of spot welds 45 to a flat foil base 47.

FIGS. 4 and 5 represent particular variations of a double acting thrust bearing in accordance with the invention. FIG. 4 is a partially disassembled view while FIG. 5 is a schematic representation in section. As best shown in FIG. 4, the depicted thrust bearing 11 corresponds in substantial degree to the configuration shown in FIG. 3 and described above, except that duplicate convoluted washers 35a, 35b and foil assemblies 37a, 37b are positioned on opposite sides of a thrust collar 39 affixed to a shaft 13. Duplicate recesses such as 33a are provided in the two housing elements 17a, 17b for receiving the foil assembly and convoluted washer combinations in the arrangement of FIG. 4. In addition to the elements described, a foil retainer ring 40 is shown of a configuration and dimensions suitable for enclosing the thrust collar 39 and completing the housing between the two halves 17a, 17b. As shown, the thrust collar 40 defines the spacing between the two halves 17a, 17b of the housing and thereby controls the preload of the foil assemblies 37a, 37b in the absence of actual thrust loads from the thrust collar 39.

It will be noted that the foil retainer ring 40 is slightly thicker at its inner portion than the thrust collar 39. The foil assemblies 37a, 37b are therefore spring loaded by the convoluted washers 35a, 35b against the foil retaining ring 40 and not the thrust collar 39. This greatly reduces starting friction and wear and also increases the thrust load capacity of the entire bearing. Without the retainer ring 40, the loaded side of the bearing is required to support the preload from the opposite convoluted washer as well as the applied thrust load.

The thrust bearings represented in FIGS. 4 and 5 are substantially identical except that in FIG. 4 the foil assemblies 37a, 37b and the convoluted washers 35a, 35b are radially positioned by a recess such as 33a in the housing member 17a, 17b, whereas the configuration depicted in FIG. 5 has the foil assemblies and convoluted washers radially positioned within the rim of the foil retainer ring designated 40a. The arrangement of FIG. 5 eliminates any need for the recess such as 33a in the housing members 17a, 17b. Both configurations are effective in providing a double acting thrust bearing with reduced starting friction and increased load capacity.

By virtue of these arrangements, the starting friction imposed by the bearing before the foils of the foil assemblies 37a, 37b become airborne is substantially reduced so that the starting torque requirements imposed upon the associated machine may be minimized. The arrangements of FIGS. 4 and 5 are adapted to support thrust loads in either direction along the axis of the shaft 13, thus providing a double acting thrust bearing which is slightly desirable in certain operations.

Figure 6:
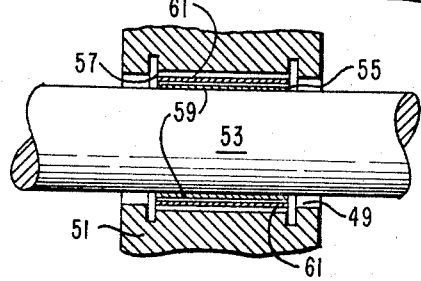
FIG. 6 is a cross-sectional view of a journal bearing in accordance with the invention.

FIG. 6 shows in section a journal bearing configuration in accordance with the invention. A cylindrical aperture 49 extends through a housing 51 to receive a rotatable shaft 53. A foil assembly 55 which is positioned within a cylindrically shaped recess 57 within and concentrically disposed about the aperture 49, comprises a plurality of foils 59 in surface engaging relation with the shaft 53 and spot welded about the periphery of a cylindrically shaped foil base 61. The aperture 49 prevents axial displacement of the foil assembly 55.

Figure 7:
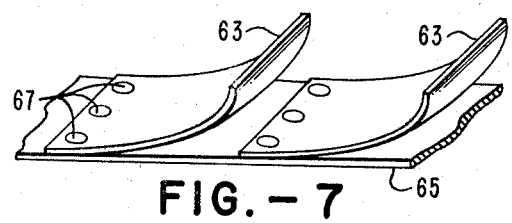
FIG. 7 is a perspective view of one particular foil arrangement in accordance with the invention.
Figure 9:
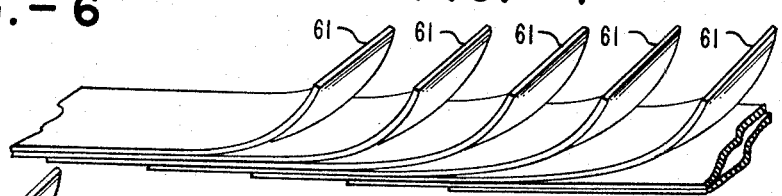
FIG. 9 is a perspective view of still another particular foil arrangement in accordance with the invention.
Figure 8:
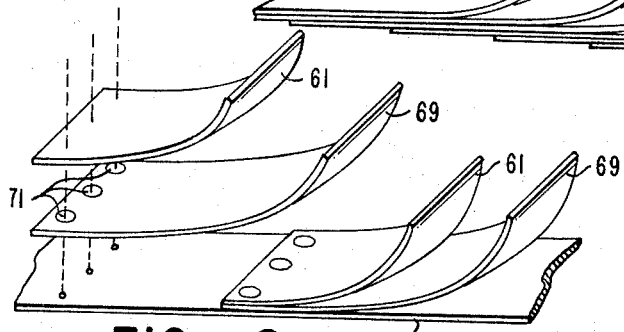
FIG. 8 is a perspective view of another particular foil arrangement in accordance with the invention.

FIGS. 7, 8 and 9 show various arrangements of foil assemblies for use with fluid-lubricated foil bearings such as those depicted in FIGS. 1–6. FIG. 7 shows a construction similar to the foil assemblies of FIGS. 2, 3, 4, 5 and 6. A plurality of metal foils 63 are overlapped with an end portion of each being fastened to a foil base 65 (which is shown as being straight and flat for illustrative purposes only) by a plurality of spot welds 67. While any number of spot welds can be used, a minimum of two is preferred to prevent any tendency by the foils 63 to rotate with respect to the foil base 65. In FIG. 8 a plurality of plastic (preferably Teflon) sheets 69 are alternatively interleaved with the metal foils 61, each of the metal foils being spot welded to the foil base 65 through a plurality of holes 71 in an interleaved plastic sheet. The Teflon advantageously minimizes metal-to-metal contact in the bearing and also is the source of a thin film which builds up on the bearing surface for added lubrication where the bearing surfaces actually touch, as in transient overloads, for example. In the arrangement of FIG. 9, the foil base 65 of FIGS. 7 and 8 is eliminated and each of the foils 61 is spot welded to an adjacent foil. While the foils 61 of FIG. 9 can be mounted in an appropriate manner to form any desired foil arrangement configuration, they are typically joined to form a circular array such as may be adapted for use in the bearings of FIG. 2 through 6. Similarly, the foil base 65 of FIGS. 7 and 8 may be appropriately fashioned to adapt the foil arrangements for use in any bearing.

By virtue of the above-described ararngements in accordance with the invention, an improved foil bearing is provided which is less subject to critical manufacturing tolerances, thus being simpler and cheaper to manufacture, and is also less subject to failure from slight dimensional distortion, and thus freer from failure in operation than previously known bearings. An improved foil assembly, which is simple and easy to manufacture, minimizes the danger of damage to the foils by sliding with the rotating shaft, should the shaft engage with the foils.

Although there have been described hereinabove particular arrangements of a foil bearing and foil assemblies for such in accordance with the invention for the purpose of illustrating the manner in which the invention may be used to advantage, it will be appreciated that the invention is not limited thereto. Accordngly, any and all modifications, variations or equivalent arrangements falling within the scope of the annexed claims should be considered to be a part of the invention.

What is claimed is:

1. A foil bearing device for use with a rotatable shaft comprising a housing having a portion adapted to receive the rotatable shaft, and a plurality of foils slidably positioned within the portion of the housing and in surface engaging relation with the rotatable shaft, when the shaft is mounted within the portion of the housing, each of the foils being held in a fixed position relative to the others to form a unitary structure.

2. The device of claim 1 further including means for confining the unitary foil structure within the portion of the housing.

3. The device of claim 1 further including a resilient element positioned between the housing and the foil structure.

4. The device of claim 3 wherein the resilient element comprises a convoluted washer.

5. A foil bearing device for use with a rotatable shaft including a thrust collar, the device comprising a housing having a recess adapted to receive the collar, and a foil assembly slidably mounted within the recess in the housing, said foil assembly comprising a plurality of foils in surface engaging relation with the collar of the rotatable shaft when the collar is received in the recess, the foils being overlapped to form a circular configuration and each of the foils being fixedly positioned in said assembly.

6. The device of claim 5 wherein each foil is affixed to an adjacent foil.

7. The device of claim 5 wherein each of the foils is fixedly mounted on a base which may be rotatably positioned within the recess in the housing.

8. The device of claim 5 where metal foils and plastic sheets are alternately interleaved in the foil assembly.

9. A foil bearing device for use with a rotatable shaft comprising a housing having an aperture extending therethrough to receive the rotatable shaft a recessed portion within the aperture in the housing and adapted to extend about the rotatable shaft, and a foil assembly positioned within the recessed portion and slidably disposed about the rotatable shaft when the shaft is received within the aperture, said foil assembly comprising a plurality of foils in surface engaging relation with the rotatable shaft when the shaft is received within the aperture, the foils being overlapped to form a circular configuration and each of the foils being affixed within said assembly.

10. A double acting foil bearing device for use with a rotating shaft having a thrust element affixed thereto, the device comprising first and second housing members adapted to encircle the shaft on opposite sides of the thrust element, and first and second foil assemblies respectively positioned between the thrust element and a corresponding housing member when the thrust element is mounted in the bearing device, each foil assembly comprising a plurality of foils affixed in position relative to each other but with each foil assembly being slidably rotatable relative to the thrust element and the corresponding housing member when the thrust element is mounted in the bearing device.

11. A bearing device in accordance with claim 10 further including a foil retaining ring between the foil assemblies, the ring being thicker than the thrust element which is adapted to be mounted in the bearing device in order to reduce bearing preload.

12. A conical foil bearing comprising a housing member having a conical recess, a rotatable shaft having a surface portion shaped to match the conical recess in the housing, and a foil assembly rotatably positioned between the shaft portion and the housing member, the assembly comprising a plurality of foils affixed together.

13. A conical foil bearing in accordance with claim 12 wherein the foil assembly further includes a base to which each of the foils is individually affixed, said base having a configuration to fit within the housing member recess without overlapping.

14. In a bearing device wherein at least two parts are in motion relative to one another, a foil assembly removably mounted between said at least two parts so that it may rotate relative to at least one of the parts, said foil assembly comprising a plurality of overlapping foils, each of which is fixedly positioned in said assembly.

15. In a bearing device wherein at least two parts are in motion relative to one another, a foil assembly removably mounted between said at least two parts so that it may rotate relative to at least one of the parts, said foil assembly comprising a base rotatably mounted between the two parts, a plurality of overlapping foils, and means affixing each foil to the base.

16. The foil assembly of claim 15 wherein the plurality of foils includes sheets of metal and plastic alternately interleaved with one another, each of the plastic sheets having at least one hole through which an adjacent metal sheet is affixed to the base by the affixing means.

References Cited

UNITED STATES PATENTS

| | | | |
|---|---|---|---|
| 1,457,081 | 5/1923 | Lieber | 308 |
| 2,566,249 | 8/1951 | Rainey et al. | 308—244 |
| 3,215,480 | 11/1965 | Marley | 308—73 |

MARTIN P. SCHWADRON, *Primary Examiner.*

FRANK SUSKO, *Examiner.*